United States Patent
Kim

(10) Patent No.: US 7,433,345 B2
(45) Date of Patent: Oct. 7, 2008

(54) WIRELESS LAN SYSTEM AND A METHOD USING THE SAME

(75) Inventor: Hyung-gon Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 651 days.

(21) Appl. No.: 10/794,402

(22) Filed: Mar. 8, 2004

(65) Prior Publication Data

US 2005/0013278 A1     Jan. 20, 2005

(30) Foreign Application Priority Data

Mar. 7, 2003   (KR) ...................... 10-2003-0014274

(51) Int. Cl.
*H04Q 7/28* (2006.01)

(52) U.S. Cl. .................... 370/341; 370/310.2; 370/322; 370/329; 370/331; 370/338; 370/348; 455/432.1; 455/435.2; 455/436; 455/437; 455/438; 455/450; 455/452.1; 455/452.2

(58) Field of Classification Search .............. 455/432.1, 455/435.2, 436, 437, 438, 450, 452.1, 452.2; 370/341, 310.2, 322, 329, 331, 338, 348
See application file for complete search history.

(56) References Cited

U.S. PATENT DOCUMENTS

| | | | | |
|---|---|---|---|---|
| 5,572,528 A | * | 11/1996 | Shuen | 370/402 |
| 5,898,929 A | * | 4/1999 | Haartsen | 455/462 |
| 6,108,321 A | * | 8/2000 | Anderson et al. | 370/329 |
| 6,259,405 B1 | * | 7/2001 | Stewart et al. | 342/457 |
| 6,442,157 B1 | * | 8/2002 | Carter et al. | 370/347 |
| 6,449,462 B1 | * | 9/2002 | Gunnarsson et al. | 455/67.13 |
| 6,580,704 B1 | * | 6/2003 | Wellig et al. | 370/338 |
| 2002/0188723 A1 | * | 12/2002 | Choi et al. | 709/225 |

FOREIGN PATENT DOCUMENTS

| | | |
|---|---|---|
| JP | 2002-158667 A | 5/2002 |
| KR | 2000-0041857 A | 7/2000 |
| WO | WO 02/093839 A2 | 11/2002 |
| WO | WO-02093839 | * 11/2002 |

* cited by examiner

*Primary Examiner*—Stephen M D'Agosta
(74) *Attorney, Agent, or Firm*—Sughrue Mion, PLLC

(57) ABSTRACT

A wireless LAN system and a method of using the same. The wireless LAN system includes at least one Interface Service Commercial module (ISCM) for collecting and transferring channel information related to channels in use for wireless networks located in a neighboring area; and an Access Point (AP) having a module for adjusting an established channel to a different frequency band channel based on a comparison result of the transferred channel information and the currently established channel. Accordingly, the wireless LAN system prevents crosstalk and interference with different LAN systems existing in a neighboring area to improve the efficiency of a wireless LAN system.

2 Claims, 8 Drawing Sheets

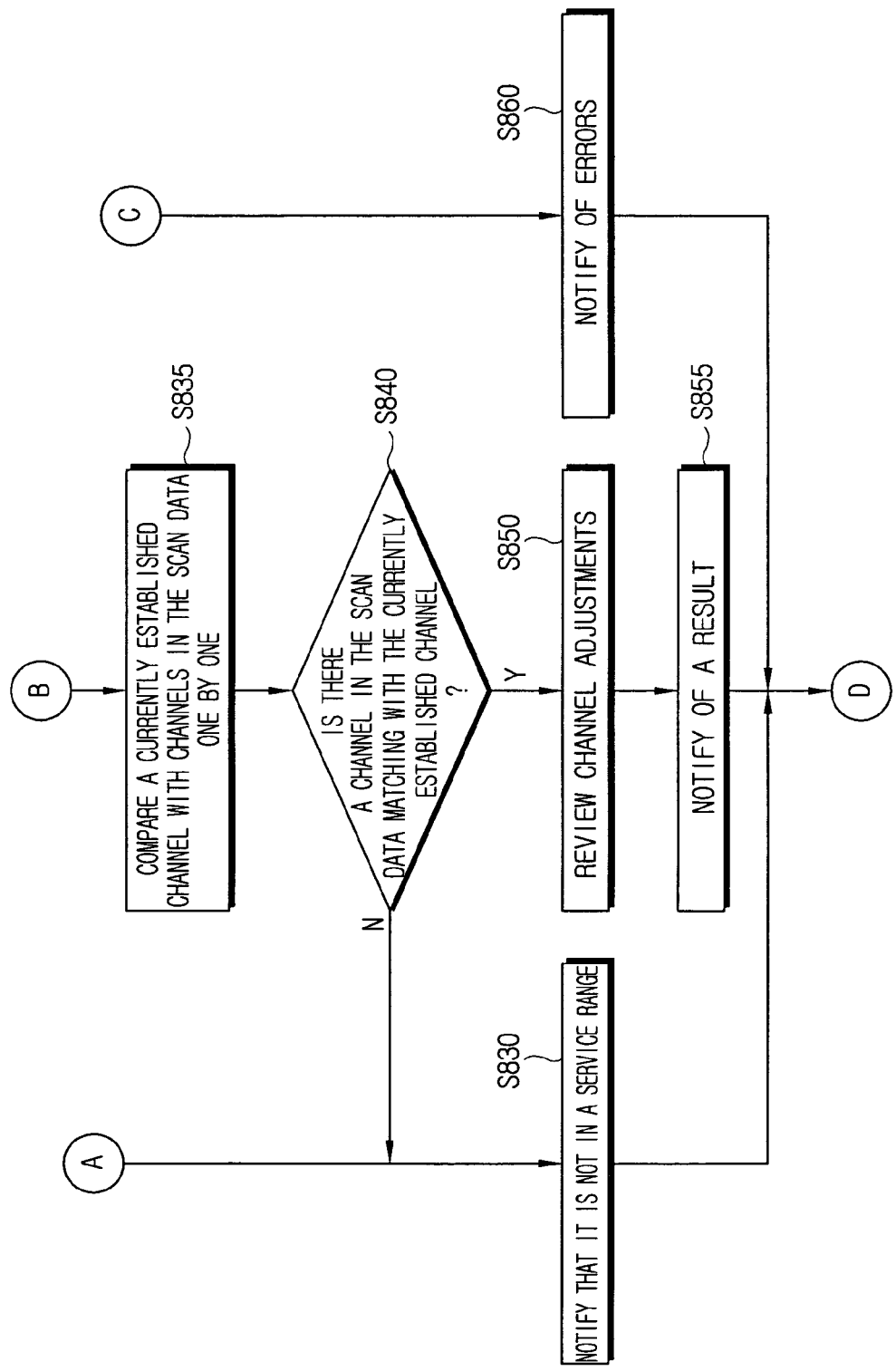

WIRELESS LAN SYSTEM AND A METHOD USING THE SAME

This application claims benefit under 35 U.S.C. § 119 from Korean Patent Application No. 2003-14274, filed on Mar. 7, 2003, the entire content of which is incorporated herein by reference.

BACKGROUND

1. Field of the Invention

Methods and apparatuses consistent with the present invention relate to a wireless LAN system and a method using the same, and more particularly, to a wireless LAN system and a method using the same, capable of preventing radio interference and crosstalk among different wireless LAN systems located in neighboring areas.

2. Description of the Related Art

The wireless LAN system is used for wireless communications in local areas, and the use of such systems is rapidly spreading due to the widespread presence and use of the Internet, the low-priced wireless devices, the increase of personal information devices, the easy configuration environments, and so on. The wireless LAN system is a communication network in the Industrial Scientific and Medical (ISM) frequency band usable without special license, which helps the spread of wireless LAN systems in homes, school classrooms, and so on.

The standard for a wireless LAN system is defined in detail in the Institute of Electric and Electronics Engineers (IEEE) 802.11 standard. The IEEE 802.11 standard defines four standards such as 802.11, 802.11a, 802.11b, and 802.11 g, as of today, and all the four standards define the use of the Carrier Sense Multiple Access/Collision Avoidance (CSMA/CA) for path sharing.

The basic building block of a wireless LAN system is a cell which is referred to as a Basic Service Set (BSS) in terms of the 802.11 standard. The cell consists of one or more wireless stations and one Access Point (AP) which is a central base station. Fixed or mobile stations and the central AP communicate with one another, using the wireless Medium Access Control (MAC) protocol of the IEEE 802.11.

FIG. 1 is a view for showing a general structure of a wireless LAN system.

Referring to FIG. 1, one cell 100 is structured with an Access Point AP1 101 and three stations, station 1A 103, station 1B 105, and station 1C 107. The station 1A 103, station 1B 105, and station 1C 107 are connected to a network in a wireless manner, and the Access Point AP1 101 receives and sends out wireless data from the individual stations 103, 105, and 107, to a wired network. The cell 100 of the wireless LAN system is determined by a service space of the Access Point AP1 101 which becomes a service range of the wireless LAN system.

However, the use of such a wireless LAN system has explosively increased, causing a problem of lowering network efficiency due to radio interference among different wireless LAN systems located in neighboring areas. Further, in most occasions, main users and operators of the wireless LAN system are general users having insufficient technical backgrounds, thereby making it difficult for the general users to deal with the technical matters properly.

FIG. 2 is a view for explaining radio interference among wireless LAN systems.

Referring to FIG. 2, there exist four different wireless LAN systems. The first wireless LAN system consists of the Access Point AP1 101), station 1A 103, station 1B 105, and station 1C 107, the second wireless LAN system consists of an Access Point AP2 201, a station 2A 203, a station 2B 205, and a station 2C 207, and the third wireless LAN system consists of an Access Point AP3 301, a station 3A 303, a station 3B 305, and a station 3C 307. Further, the fourth wireless LAN system consists of an Access Point AP4 401, a station 4A 403, a station 4B 405, and a station 4C 407.

In such circumstances, the service range 100 of the first wireless LAN system overlaps with parts of the service range 200 of the second wireless LAN system and the service range 300 of the third wireless LAN system. That is, the station 1C 107 and the station 2A 203 are located in the area where the service range 100 of the first wireless LAN system and the service range 200 of the second wireless LAN system overlap, and the station 1B 105 and the station 3B 305 are located in the area where the service range 100 of the first wireless LAN system and the service range 300 of the third wireless LAN system overlap. In such circumstances, the same channel established and used for the first, second, and third wireless LAN systems produces radio interference and crosstalk, to thereby lower the network efficiency. Further, even though different channels are established for the systems, channels in neighboring frequency ranges also lower the network efficiency.

Table 1 below is one showing ISM band frequency allocations for wireless LAN system by country.

TABLE 1

| Channel | Center Frequency | Korea | North America (USA, Canada) | Europe, Australia | France | Japan |
| --- | --- | --- | --- | --- | --- | --- |
| 1 | 2412 | ○ | ○ | ○ | | ○ |
| 2 | 2417 | ○ | ○ | ○ | | ○ |
| 3 | 2422 | ○ | ○ | ○ | | ○ |
| 4 | 2427 | ○ | ○ | ○ | | ○ |
| 5 | 2432 | ○ | ○ | ○ | | ○ |
| 6 | 2437 | ○ | ○ | ○ | | ○ |
| 7 | 2442 | ○ | ○ | ○ | | ○ |
| 8 | 2447 | ○ | ○ | ○ | | ○ |
| 9 | 2452 | ○ | ○ | ○ | | ○ |
| 10 | 2457 | ○ | ○ | ○ | ○ | ○ |
| 11 | 2462 | ○ | ○ | ○ | ○ | ○ |
| 12 | 2467 | ○ | | ○ | ○ | ○ |
| 13 | 2472 | ○ | | ○ | ○ | ○ |
| 14 | 2484 | | | | | ○ |

The Federal Communication Commission (FCC) recommendation indicates that, in order to avoid interference among wireless LAN systems, a physically stable and independent wireless LAN system without radio interference and crosstalk can be constructed when the center frequency of the current channel established for use is separated by 22 MHz, from the center channel frequency of the channel used by another wireless LAN system, i.e., the current channel is separated by five channels from the channel used by another wireless LAN system. For example, a device using the center channel frequency 2412 MHz on channel 1 would require another device to use the center channel frequency of at least 2434 MHz to avoid interference. From Table 1, the channel which maintains the 22 MHz separation would be 2437 MHz on channel 6. Thus, one channel in use has to be separated by five channels from another channel in use. Accordingly, it is necessary to use a channel separated by more than a certain amount from another channel even though a current channel in use is not the same as a channel in use for another neighboring wireless LAN system.

Therefore, it is necessary to detect whether there is a channel in use of a current wireless LAN system which produces radio interference and crosstalk with a channel in use for another wireless LAN system in a neighboring area, and to properly adjust the current channel in use.

SUMMARY

The present invention has been devised to solve the above problem, so it is an aspect of the present invention to provide a wireless LAN system and a method using the same, capable of detecting whether there is radio interference between channels established for use in current wireless LAN systems, and properly adjusting the channels accordingly.

In order to achieve the above aspect, a wireless LAN system according to the present invention comprises at least one Inter-Space Channel Monitors (ISCMs) for collecting and transferring channel information related to channels in use for wireless networks located in neighboring area; and an Access Point (AP) having a module for adjusting an established channel to a different frequency band channel based on a comparison result of the transferred channel information and the currently established channel.

Preferably, but not necessarily, the AP adjusts the established channel to be spaced apart by more than 4 channels from the channel in use for the wireless networks, and in an exemplary embodiment, the ISCMs are wireless LAN stations each further comprising a module for searching and transferring the channel information to the AP. Further, the ISCMs can transfer the channel information to the AP through a wired network.

In the meantime, a method using wireless LAN systems according to the present invention comprises steps of collecting and transferring channel information related to channels in use for wireless networks located in neighboring area; and adjusting an established channel to a different frequency band channel based on a comparison result of the transferred channel information and the currently established channel for a current Access Point (AP).

Preferably, but not necessarily, the adjustment step adjusts the established channel to be spaced apart by more than 4 channels from the channel in use for the wireless networks, and in an exemplary embodiment, the transfer step is performed by a wireless LAN station further including a module for searching and transferring the channel information to the AP. Further, the transfer step can transfer the channel information through a wired network.

BRIEF DESCRIPTION OF THE DRAWINGS

Various embodiments of the present invention will be described in detail with reference to the following drawings in which like reference numerals refer to like elements, and wherein:

FIG. 7, FIG. 8A, and FIG. 8B are flow charts for explaining the operation method for the wireless LAN system according to an embodiment of the present invention.

DETAILED DESCRIPTION OF THE EXEMPLARY EMBODIMENT

Hereinafter, the present invention will be described in detail with reference to the accompanying drawings.

Figure 1:
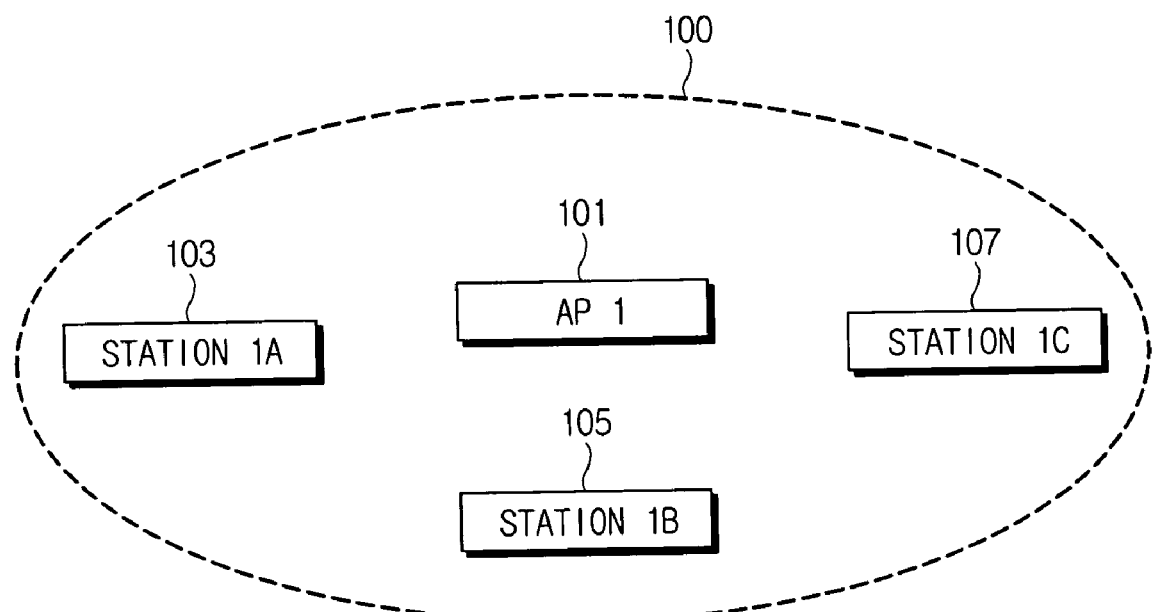
FIG. 1 is a view for showing a structure of a general wireless LAN system.
Figure 2:
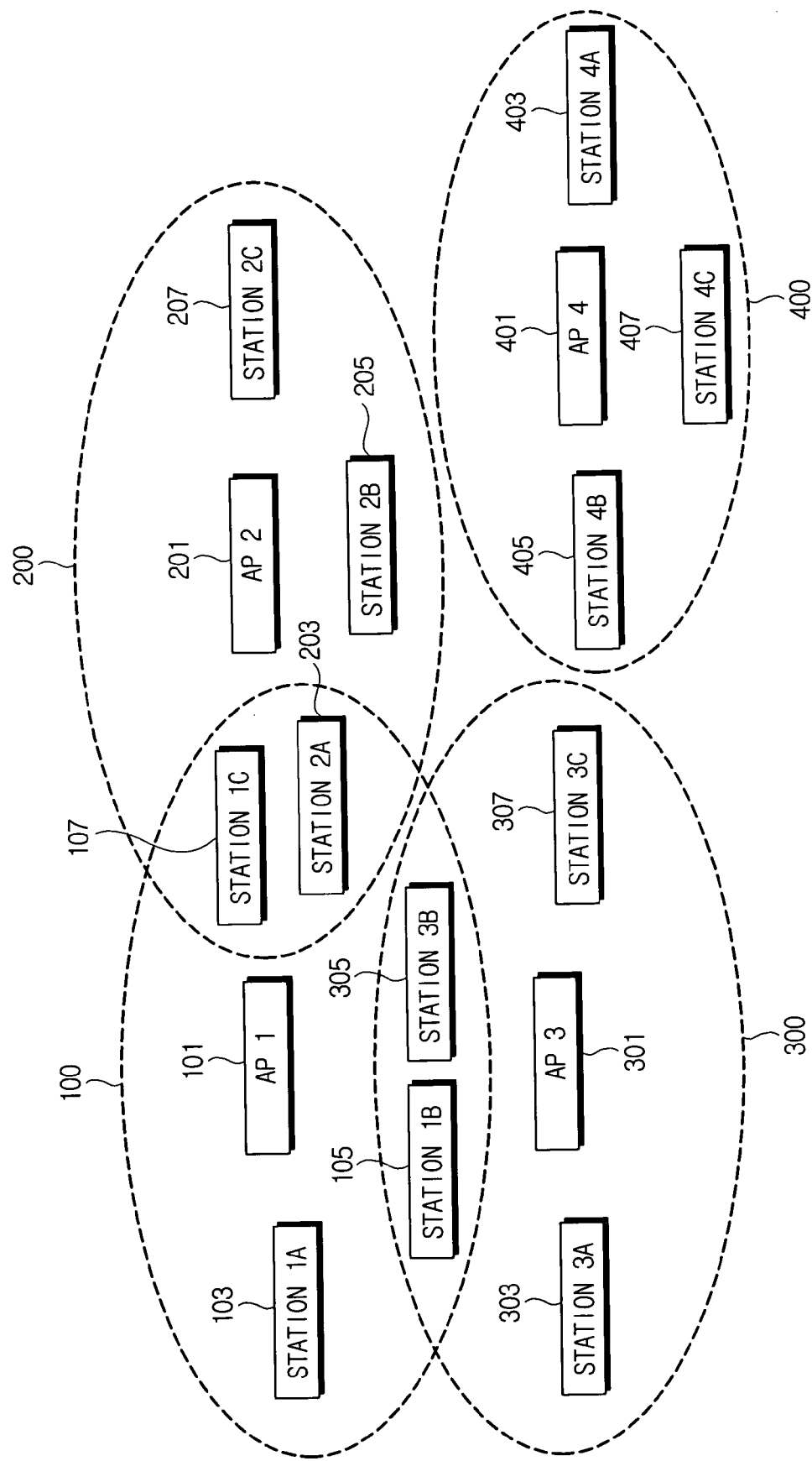
FIG. 2 is a view for explaining radio interference among wireless LAN systems.
Figure 3:
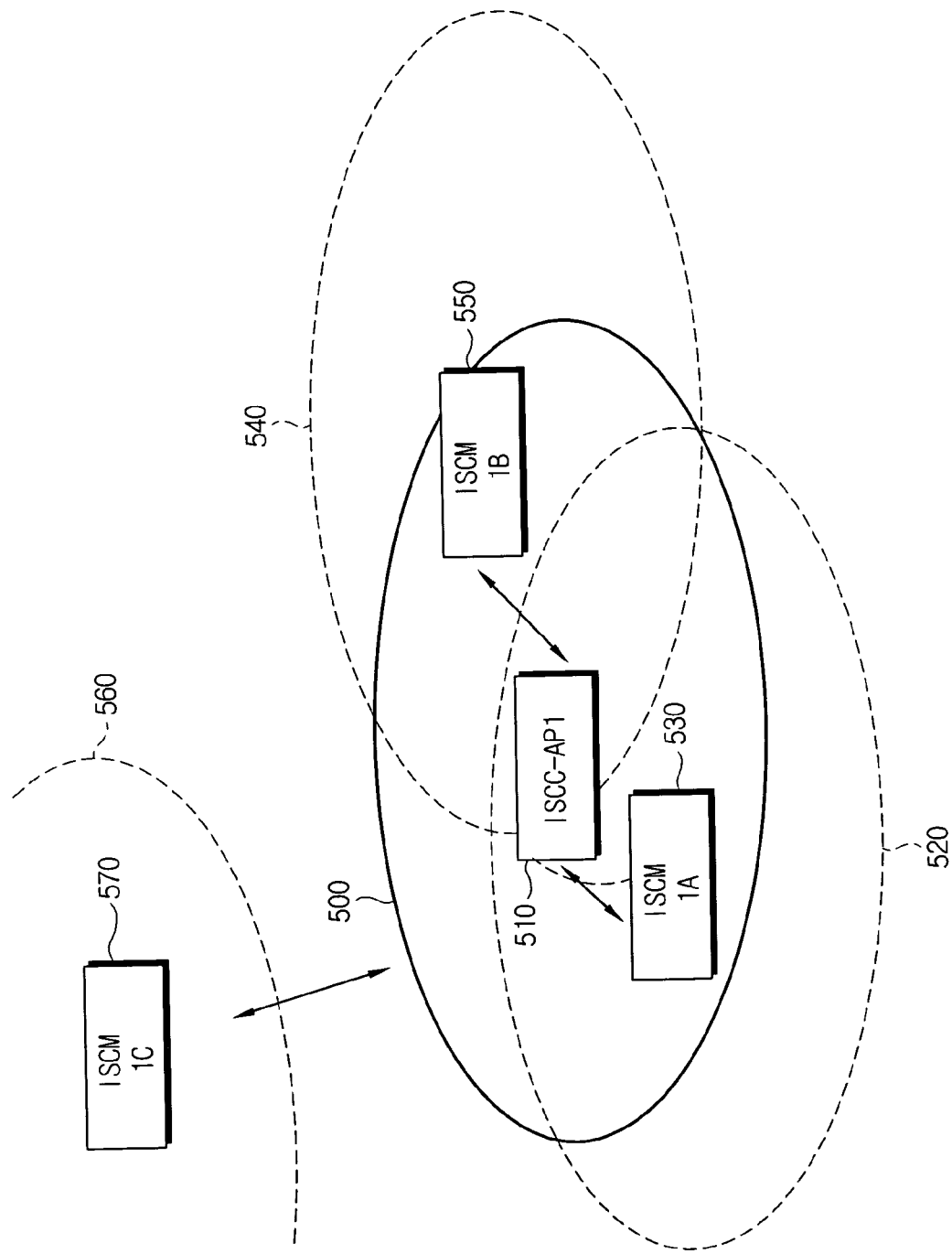
FIG. 3 is a view for showing a structure of a wireless LAN system according to an embodiment of the present invention.

FIG. 3 is a view for showing a structure of a wireless LAN system according to an embodiment of the present invention.

Referring to FIG. 3, the wireless LAN system consists of an ISCC-AP1 510, an ISCM 1A 530, an ISCM 1B 550, and an ISCM 1C 570.

The ISCC-AP 510 is provided with the Inter-Space Channel Coordinator (ISCC) function in addition to the basic Access Point (AP) function. Here, the ISCC function, in the event that there is radio interference among different neighboring wireless LAN systems, refers to a function capable of detecting the radio interference and adjusting a current established channel to a channel having no radio interference.

The ISCM 1A 530, ISCM 1B 550, and ISCM 1C 570 scan channel states in use for wireless LAN systems located in ambient areas, and notify the ISCC-AP1 510 of the related channel information.

In FIG. 3, an area in a solid line indicates a service range of a cell, that is, a wireless LAN system including the ISCC-AP1 510, and areas in dotted lines indicate scan ranges for the ISCM 1A 530, ISCM 1B 550, and ISCM 1C 570 to perform scanning.

Figure 4:
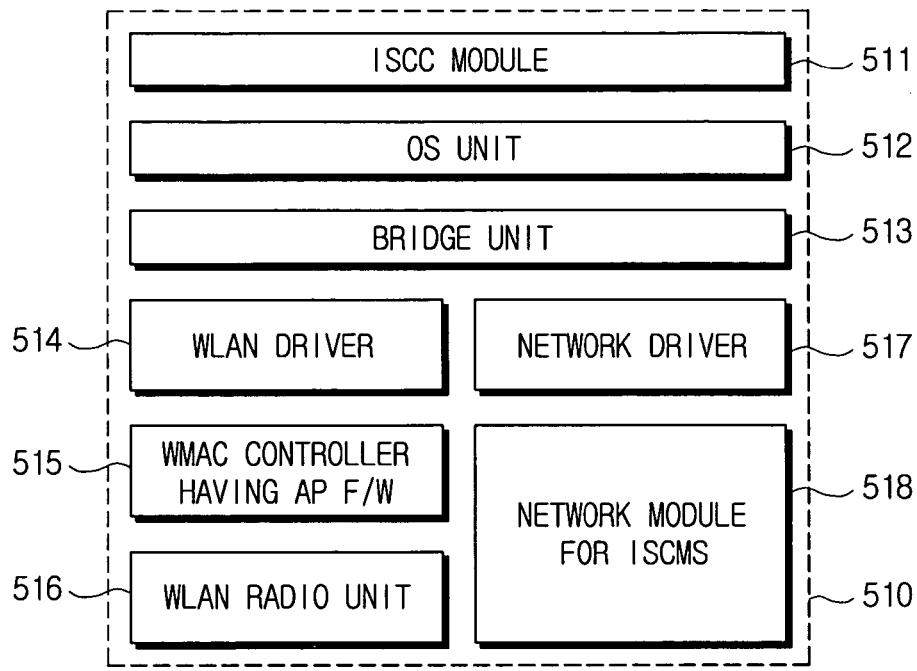
FIG. 4 is a view for showing a structure of the ISCC-AP1 of FIG. 3.

FIG. 4 is a view for showing a structure of the ISCC-AP1 510 shown in FIG. 3.

Referring to FIG. 4, the ISCC-AP1 510 is provided with a ISCC module 511, an OS unit 512, a bridge unit 513, a WLAN driver 514, a Wireless Media Access Control (WMAC) controller having an AP Firmware (F/W) 515, a WLAN RADIO unit 516, a network driver 517, and a network module 518 for an ISCM.

A general AP is equipped with the OS unit 512, bridge unit 513, WLAN driver 514, WMAC controller 515 having an AP F/W, WLAN RADIO unit 516, and network driver 517, and the ISCC module 511 and the network module 518 for the ISCM are newly added in the general AP.

The ISCC module 511 performs the ISCC function for adjusting established channels based on scan information received from the ISCM, and the network module 518 for the ISCM communicates with the ISCMs.

Figure 5:
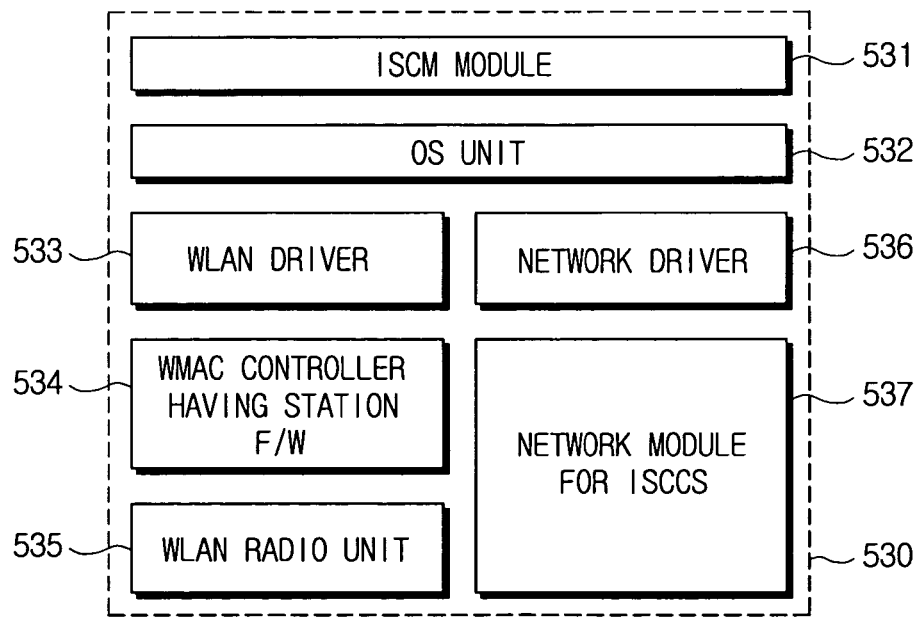
FIG. 5 is a view for showing a structure of the ISCM 1A.

FIG. 5 is a view for showing a structure of the ISCM 1A 530 shown in FIG. 3.

Referring to FIG. 5, the ISCM 1A 530 consists of an ISCM module 531, an OS unit 532, a WLAN driver 533, a WMAC controller 534 having a station F/W, a WLAN RADIO unit 535, a network driver 536, and a network module 537 for the ISCC.

A general wireless LAN station includes the ISCM module 531, OS unit 532, WLAN driver 533, WMAC controller 534 having a station F/W, WLAN RADIO unit 535, and network driver 536, and the ISCM module 531 and the network module 537 for the ISCC are newly added to the general wireless LAN station.

The ISCM module 531 performs functions for monitoring and reporting channels of wireless LAN systems in neighboring areas and their circumferential states. The network module 537 for the ISCC performs communications with the AP having the ISCC function.

In the meantime, the structure and function of the ISCM 1B 550 and the ISCM 1C 570 are the same as the ISCM 1A 530.

Figure 6:
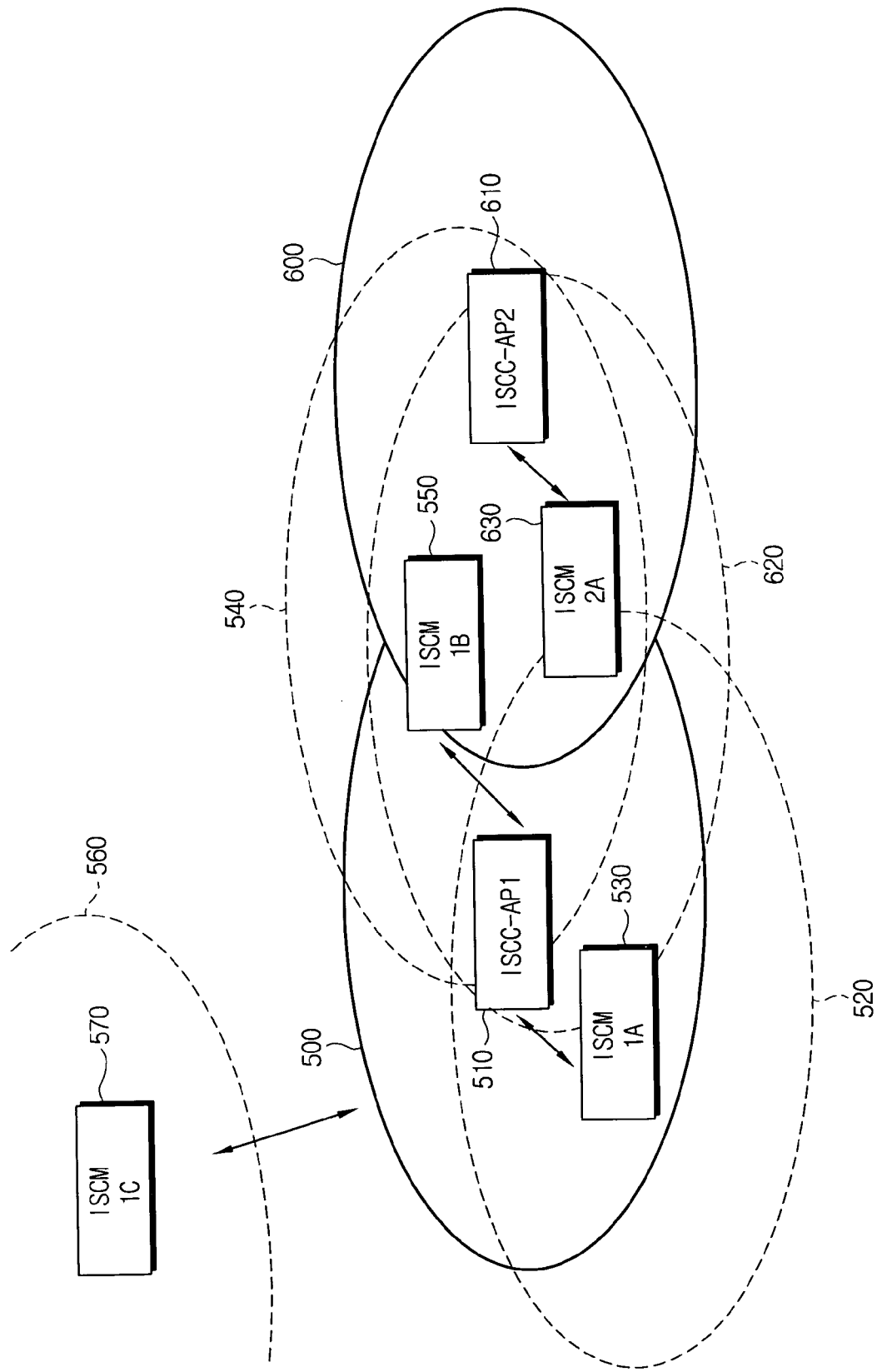
FIG. 6 is a view for explaining an operation method for the wireless LAN system according to an embodiment of the present invention.

FIG. 6 is a view for explaining an operation method of the wireless LAN system according to an embodiment of the present invention. Referring to FIG. 6, one wireless LAN system includes the ISCC-AP1 510 having the ISCC function and the ISCM 1A 530, the ISCM 1B 550, and the ISCM 1C 570, and, in an area adjacent to the above wireless LAN system, another wireless LAN system includes ISCC-AP2 610 having the ISCC function and an ISCM 2A 630.

In FIG. 6, it can be seen that the service range 500 of the ISCC-AP1 510 and the service range 600 of the ISCC-AP2 610 partially overlap with each other. In such circumstances, the ISCM 1A 530, ISCM 1B 550, and ISCM 1C 570 notify the ISCC-AP1 510 of scan data searched in respective scan ranges indicated in dotted lines, and the ISCM 2A 630 notifies the ISCC-AP2 610 of the scan information.

Under such circumstances, an operation method of the wireless LAN system according to an embodiment of the present invention will be described as follows with reference to the flow charts of FIG. 7, FIG. 8a, and FIG. 8b.

Figure 7:
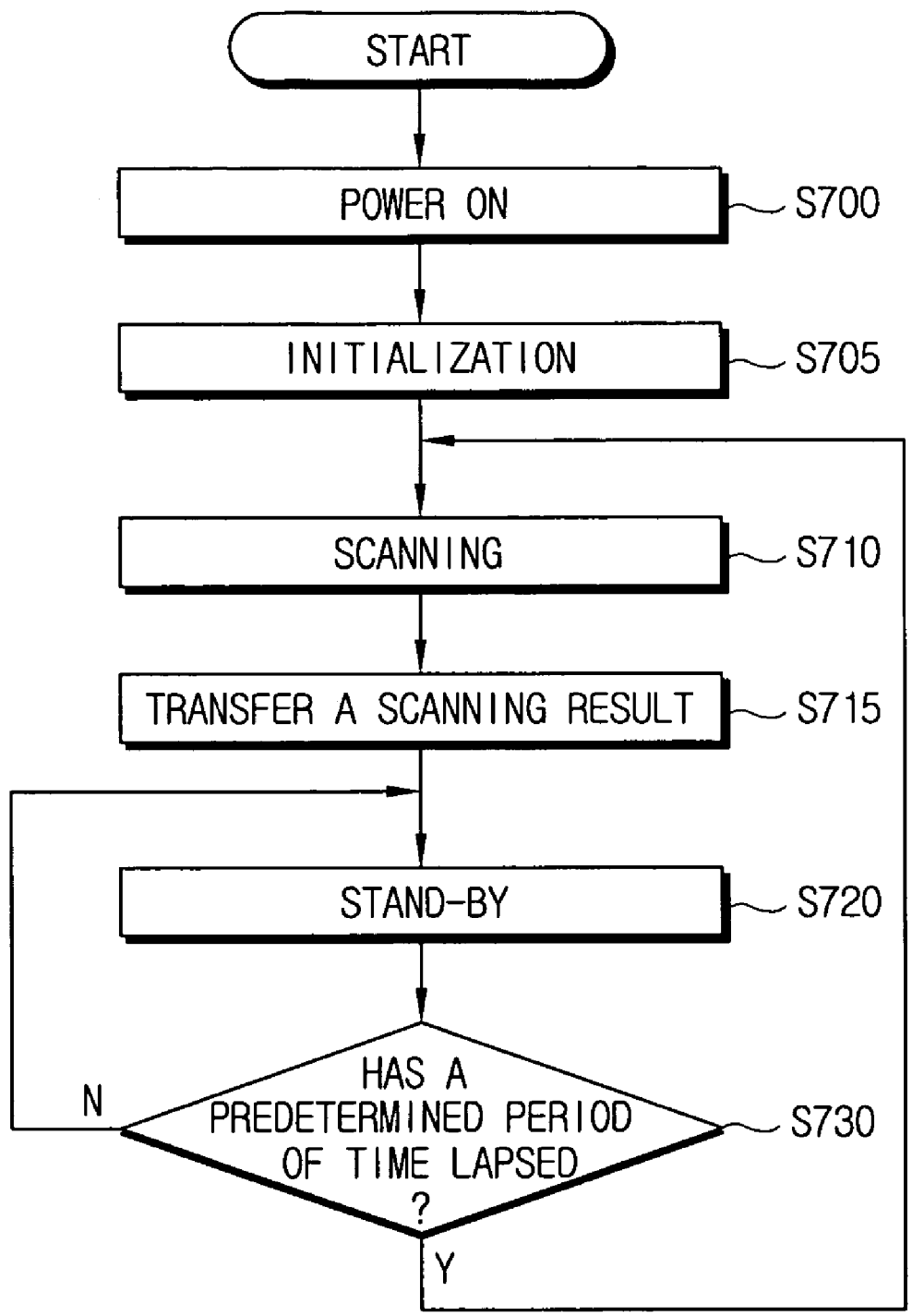

First, FIG. 7 is a flow chart for explaining an operation method for each ISCM. Referring to the flow chart, electric power is initially applied (S700) and an initialization process is carried out (S705). After the initialization process, each ISCM scans neighboring ranges (S710).

That is, the ISCM 1A 530 scans the corresponding scan range 520. In this case, only the ISCC-AP1 510 is scanned in the scan range 520 of the ISCM 1A 530, so scan data is collected in a table format as follows:

TABLE 2

| ISCM number | ESSID | Channel Number | Privacy (WEP) | Supported rates | Link Status | SNR |
|---|---|---|---|---|---|---|
| 1 | AP #1 MAC Add. | 1 | On | 11 Mbps | 11 Mbps | ... |

The above scan data is formed by adding the ISCM number and the like to the scan data used for a general wireless LAN system.

For ISCM 1B 550, there exist the ISCC-AP1 510 and the ISCC-AP2 610 in the corresponding scan range 540, so the following scan data is collected as a result of the scanning.

TABLE 3

| ISCM number | ESSID | Channel Number | Privacy (WEP) | Supported rates | Link Status | SNR |
|---|---|---|---|---|---|---|
| 2 | AP #1 MAC Add. | 1 | On | 11 Mbps | 11 Mbps | ... |
| 2 | AP #2 MAC Add. | 1 | On | 11 Mbps | 11 Mbps | ... |

In the case of the ISCM 1C 570, there exists no AP in the corresponding scan range 560, so the following scan data is collected.

TABLE 4

| ISCM number | ESSID | Channel number | Privacy | Supported rates | Link Status | SNR |
|---|---|---|---|---|---|---|
| 3 | | | None | | | |

The scan data obtained as a result of the scanning of each ISCM is transferred to the ISCC-AP1 510 (S715). After the transfer of the scanning results, each ISCM waits for a predetermined period of time, and, after the predetermined period lapses, each ISCM repeats the scanning operation (S720 and S730).

Figure 8A:
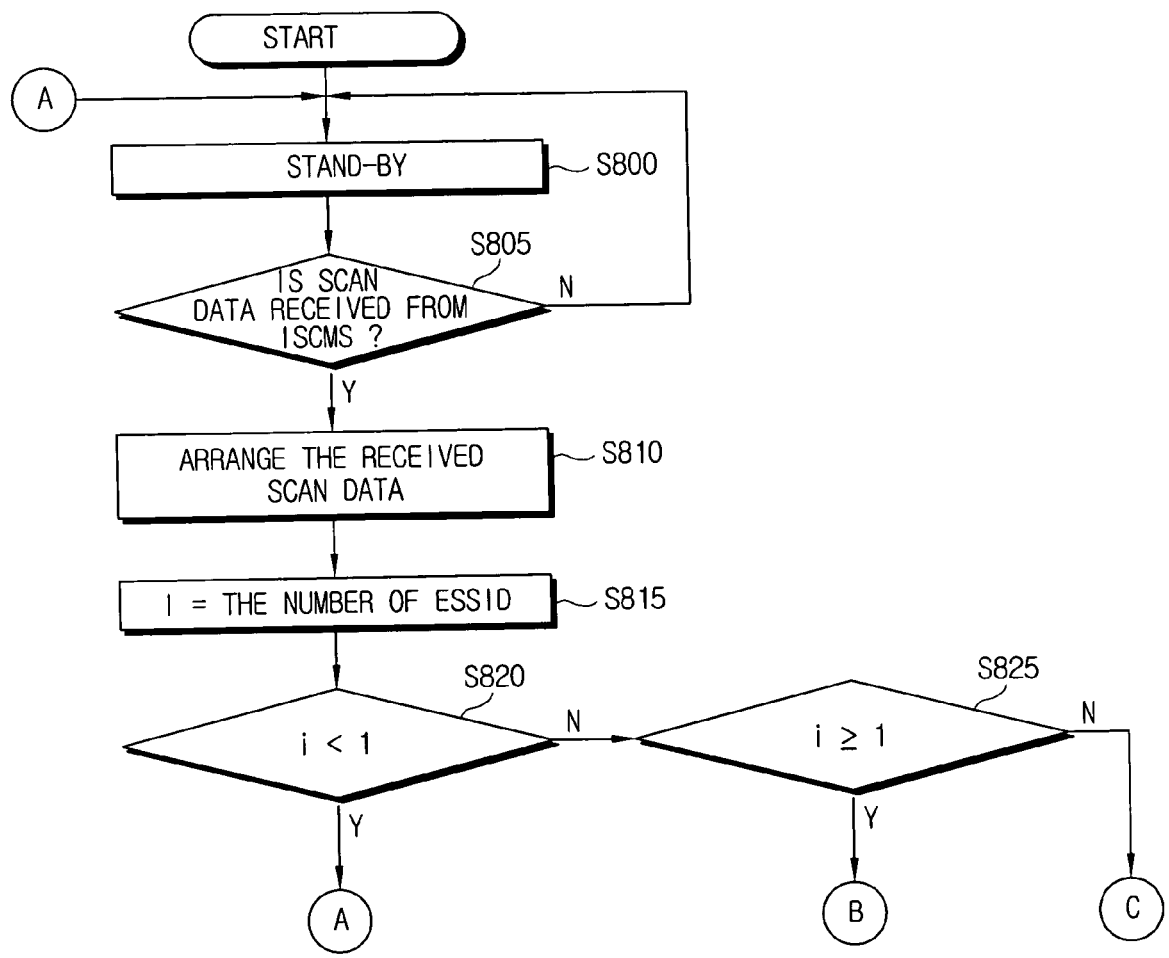

FIG. 8a and FIG. 8b are flow charts for explaining an operation method of the ISCC-AP1 510.

The ISCC-AP1 510 having an ISCC function, like the general AP, sets the components a user wishes to use for its operations after electric power is applied thereto for the first time.

In the flow charts, first, the ISCC-AP1 510 maintains the stand-by by state until scan data arrives from each ISCM (S800 and S805), and, if the scan data is received from the ISCM, the ISCC-AP1 510 arranges the received scan data (S810). The following table shows the results of the arrangement of the received scan data from the ISCM 1A 530, ISCM 1B 550, and ISCM 1C 570.

TABLE 5

| No. | ESSID | Channel Number | Privacy (WEP) | Supported rates | Link Status | SNR | ISCM number | Locatiion |
|---|---|---|---|---|---|---|---|---|
| 1 | AP #1 MAC Add. | 1 | On | 11 Mbps | 11 Mbps | ... | 1 | ... |
| 2 | AP #2 MAC Add | 1 | On | 11 Mbps | 11 Mbps | ... | 2 | ... |
| 3 | AP #1 MAC ADD. | 1 | On | 11 Mbps | 11 Mbps | ... | 2 | ... |
| 4 | | | | None | | | 3 | ... |

If the scan data is completely arranged, the ISCC-AP1 510 performs a process according to the number of the Extended Service Set Identifier (ESSID), I (S815).

First, a situation where there exists no scanned channel (in the case of i<1) means that there exists no AP in the scan range of a corresponding ISCM, so the ISCC-AP1 510 notifies that the range where the corresponding ISCM has scanned is not in a current service range (S830). In this situation, there exists no interfering channel, so no channel adjustment is required.

If there exists one or more scanned channels (i>1) as a result of the arrangement of the received scan data, the ISCC-AP1 510 compares the currently established channel with the scanned channels of the received scan data (S835). If all the scanned channels are not matched with the currently established channel as a result of the comparison, the ISCC-AP1 510 reports the result since the service ranges for all the scanned channels do not overlap with the current service range, as in the situation when there exists no scanned channel (S840 and S830). Even in this situation, the channel adjustment is not necessary since there is no overlapped range.

However, a situation where there exists a channel matching with the currently established channel in the scan data as in Table 5 means that there exists radio interference in the current service range, so it is necessary to review the channel adjustment (S850). However, a situation where there is one scanned channel (that is, in the case of i=1) and there exists a channel matching with the currently established channel in the scan data means that there exists only the AP itself in the current service range, so there is no need to adjust channels.

The following describes a process for reviewing channel adjustments in the step S850. First, a situation where the currently established channel spaced apart by more than 4 channels from the channel of the scan data means that there is no radio interference in the current service range, so the ISCC-AP1 510 notifies a system manager of such a state. If the currently established channel and the channel of the scan data are not spaced apart by more than 4 channels, the ISCC-AP 510 notifies the system manager of all the channels of the scan data and arbitrary channels spaced apart by more than 4 channels from all the channels of the scan data (S855) to adjust the currently established channel to a channel with less interference.

A situation where the currently established channel is spaced apart by more than 3 channels from the channel of the scan data means that there exists little or no radio interference even though the current channel is used. However, if there exist arbitrary channels spaced apart by more than 3 channels from all the channels of the scan data, the ISCC-AP1 510 notifies the system manager of such a result to adjust the currently established channel to a more proper channel with less interference.

Further, if there exists no channel spaced apart by more than 3 channels from all the channels of the scan data, the ISCC-AP1 notifies the system manager of such a state in order that a user can be notified that it is necessary to adjust the currently established channel to a channel with less interference.

Through the above process, the ISCC-AP1 510 can detect the when an interference phenomenon is produced due to different wireless networks existing in an area adjacent to a current service range, and properly adjust channels.

As described above, the present invention can detect the occasion that there exists radio interference between a currently established channel in use for a wireless LAN system and a channel in use for a different wireless LAN system located adjacent to a coverage range of the wireless LAN system. Accordingly, the present invention adjusts channels to a proper channel without radio interference, to thereby prevent crosstalk and interference and improve the efficiency of a wireless LAN system.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A wireless LAN system, comprising:
at least one of wireless devices for collecting and transferring channel information related to used channels in use for wireless networks located in neighboring areas; and
an Access Point (AP) having a first module for comparing a first established channel with the channel information and adjusting the first established channel to a second established channel at a different frequency band channel if the first established channel is not spaced apart from each of the used channels for the wireless networks by more than a certain number of channels,
wherein the AP adjusts the first established channel to be spaced apart by more than 4 channels from each of the used channels in use for the wireless networks,
wherein the wireless devices are wireless LAN stations, each of the wireless LAN stations comprising a module for searching and transferring the channel information to the AP,
wherein the at least one of the wireless devices transfers the channel information to the AP through a wired network, and
wherein the wireless devices are Inter-Space Channel Monitors (ISCMs).

2. A method of using wireless LAN systems, comprising:
collecting and transferring channel information related to used channels in use for wireless networks located in neighboring areas;
comparing a first established channel for an Access Point (AP) with the channel information; and
adjusting the first established channel to a second established channel at a different frequency band channel if the first established channel is not spaced apart from each of the used channels for the wireless networks by more than a certain number of channels,
wherein the adjusting the first established channel comprises adjusting the first established channel to be spaced apart by more than 4 channels from the used channels in use for the wireless networks,
wherein the transferring the channel information is performed by a wireless LAN station, the wireless LAN station comprising a module for searching and transferring the channel information to the AP,
wherein the transferring the channel information transfers the channel information through a wired network, and
wherein the wireless devices are Inter-Space Channel Monitors (ISCMs).

* * * * *